United States Patent Office 2,999,732
Patented Sept. 12, 1961

2,999,732
INHIBITING CORROSION IN WATER SYSTEMS WITH PHOSPHATE-CHROMATE-EDTA COMPOSITIONS
Harry Lewis Kahler, Feasterville, and Charles B. George, Philadelphia, Pa., assignors, by mesne assignments, to Betz Laboratories, Inc., a corporation of Pennsylvania
No Drawing. Filed Jan. 9, 1957, Ser. No. 633,188
6 Claims. (Cl. 21—2.7)

The present invention relates to new and improved processes for inhibiting corrosion of metals and new and improved compositions for this purpose. These processes and compositions are particularly effective in protecting against the attack of metal surfaces by the corrosive action of water, the metals protected being particularly iron and steel, and the copper base alloys.

The present invention is a further development of the subject matter of our U.S. patent application, Serial No. 418,458, filed March 24, 1954, for Corrosion Inhibiting, now U.S. Patent 2,872,281, granted February 3, 1959.

The extensive use of water for cooling purposes in systems and structures which are entirely or partially made of metal gives rise to extensive corrosion unless protection is employed. The reduction or prevention of such corrosive attack is a very difficult problem. In cooling systems such as cooling towers, water conditioning systems, condensers, heat exchangers and distributing systems, the effect of corrosive action of the water present is often quite complex. Aside from the actual reduction of the useful life of the metallic structure, the corrosion produced may interfere with heat transfer efficiency, decrease flow, increase treatment costs, and otherwise increase production costs.

While various techniques are being used to prevent metallic corrosion by water, one of the more effective and certainly most widely used is the chemical treatment of the cooling water itself. Chemical treatments in relation to the quantities of chemicals involved are highly effective, offering a decided economic advantage.

While numerous materials and treatments are available for chemical treatment of cooling water, corrosion control is a complex problem, and no one treatment is effective in all cases and under all conditions.

Our copending application, now U.S. Patent No. 2,872,281 above referred to, discloses a technique for controlling the corrosion of metallic surfaces in water through the use of phosphate and trivalent chromium compound coatings. It was shown by our prior investigation that by incorporating water soluble salts of phosphate with water soluble compounds containing the trivalent chromium ion, corrosion inhibition of exceptional power could be produced. This method introduces phosphates and trivalent chromium in a water soluble state and in such concentration and ratios that compounds of trivalent chromium in excess of the solubility are produced. These highly insoluble trivalent chromium compounds are formed in very low concentrations of reactants throughout the treated water and are readily deposited on all surfaces, metallic or nonmetallic, in contact with the water. Corrosion on all metal surfaces is reduced to a remarkable degree equalling chromates in respect to metal saving, while avoiding the pitting characteristics of chromates in low concentrations.

The protective method using phosphate-trivalent chromium compound coatings, while effective to some extent by chemical action at the metal surface, derives its primary benefit from shielding action of the deposited coating, which constitutes a barrier to the corrosive water. While the protection by the chromic compound coating is usually easy to use, under some conditions it is difficult to provide the proper quality and thickness of insoluble chromic coating. Furthermore, in some systems there is difficulty in extending the protective coating formation far enough to be effective in remote parts of the system. The present invention relates to improvements which overcome these difficulties.

A purpose of the invention is to further increase the inhibitory power of chromic coatings.

A further purpose is to improve the coating carrying power of chromic coatings.

A further purpose is to obtain greater economy in the use of chemicals in phosphate-trivalent chromium treatments.

A further purpose is to secure greater certainty in corrosion protection, using chromic coatings.

A further purpose is to obtain better corrosion protection in the presence of sulphides.

A further purpose is to obtain more effective corrosion protection in water systems in which residual elemental chlorine from chlorination is present.

A further purpose is to utilize organic reducing agents, either naturally present or specially added to increase the effectiveness of protection by phosphate and by chromium.

A further purpose is to introduce into the water of the water system from 1 to 1000 and preferably from 1 to 200 p.p.m. of water soluble phosphate, from 0.1 to 100 and preferably from 0.2 to 22 p.p.m. of trivalent chromium ion derived from water soluble chromium compound, and from 1 to 50 and preferably from 2 to 20 p.p.m. of amino carboxylic acid having the typical formula:

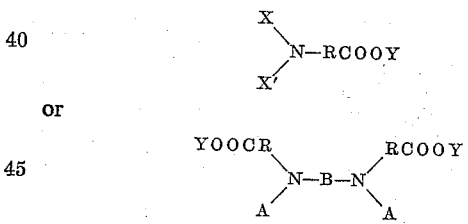

where

X is H, or an alkylol group —$CH_2OH$, —$C_2H_4OH$ or —$C_2H_3(OH)_2$ or an —RCOOY group, R being as mentioned below;

X' is an alkylol group —$CH_2OH$, —$C_2H_4OH$, or —$C_2H_3(OH)_2$ or an —RCOOY group, R being as mentioned below;

Y is H, or an alkali metal or an alkaline earth metal, nickel, cobalt or iron;

R is $CH_2$, $C_2H_4$ or $C_3H_6$;

A is H, —$CH_2COOY$, $CH_3$, $C_2H_5$, —$CH_2OH$ or —$C_2H_4OH$;

B is an alkylene group $C_2H_4$, $C_3H_6$, or an alkylol group $C_2H_3OH$, or a polyalkylene amine radical

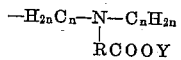

where $n$ is 1, 2 or 3. The A's need not be the same and the R's need not be the same. The carbonyl groups at the acidic end may be combined or chelated with hydrogen, or with an alkali metal such as sodium or potassium, or with an alkaline earth metal such as calcium, strontium, magnesium or barium, or with iron, nickel or cobalt. These compounds mentioned above are called herein "effective amino carboxylic acids." A pH in the range from 5 to 8.5 and preferably from 5 to 6.5 is maintained.

We have found that we can impart to water treating compositions comprising phosphate-trivalent chromium compounds an enhanced inhibitory power by the addition of water soluble amino carboxylic acids of an effective structure as explained below. These compounds all possess the property of being capable of forming complexes with the chromic ions. They may properly be termed chelating agents.

The effective amino carboxylic acid when added to the phosphate-chromic treatment restrains and controls the formation of insoluble protection compounds, and thereby decidedly extends the carrying power of the treatment and insures that the coating will be distributed through extensive cooling systems.

This is a distinct benefit as compared with previous treatments.

In addition, the effective amino carboxylic acids enhance the protection of the phosphate-chromic compound to such an extent that the tendency of localization of attack that sometimes appeared in the past when the treatment was inadequate or the corrosion loads were excessive, has been largely eliminated. Furthermore, since the effective amino carboxylic acids increase the total inhibitory power of the phosphate-chromic coatings, it is possible to obtain the same extent of inhibition by using lower concentrations and at lower cost. In addition the effective amino carboxylic acids by their chelating action regulate the coating thickness, avoiding excessive thicknesses which might interfere with heat transfer.

Despite this thinning of the chromic compound coatings, the protective action is actually better, indicating that the effective amino carboxylic acid exerts a power in altering the properties of the coating.

A series of tests have been conducted as set forth in Table I. Very severe test conditions were set up so as to obtain early failure if the protection was not fully satisfactory. In this way it was found possible to evaluate the benefit of the effective amino carboxylic acids and their derivatives precisely and very rapidly. The evaluation as shown in Table I was based on metal loss, tuberculation and pitting attack, and texture of the chromic compound coating on the metal specimens.

The test equipment involved the use of three systems so that three simultaneous tests were carried out. Each system comprised a round glass jar holding 24 liters of corrosive water in which as many as eight specimens were rotated or spun at any desired speed. The tests reported in Table I extended for one day only, but these tests were consistent with those obtained over ranges from one to five days and also with plant experience with the effective amino carboxylic acids. In the tests in Table I the treatment and corrosion water was replenished every twenty-four hours only.

The corrosion water used was distilled water with added ion to give an analysis of 38 p.p.m. Ca, 25 p.p.m. Mg, both calculated as calcium carbonate, 500 p.p.m. Cl, 60 p.p.m. $SO_4$, 0.2 p.p.m. Cu, pH 6 and saturated with air from a continuous stream of air. The temperature was 120° F. and the spinning rate was sufficient to give to the water a flow rate past the specimens of 0.35 foot per second.

The specimens were flat steel sheets having a composition of 0.9 percent carbon, 1.4 percent manganese, 0.04 percent sulphur, 0.3 percent silicon, no phosphorus and balance iron.

Before exposure the specimens were resurfaced, using No. 80 grit grinding wheel to a machined surface of R.M.S. 20 microinches to allow for accurate evaluation of pits. Before immersion, the specimens were cleaned with tripoli, an abrasive, and trisodium phosphate followed by a water rinse, an alcohol rinse and drying. The specimens were evaluated at a magnification of 20 diameters.

In Table I the phosphate was fed as sodium tripolyphosphate and disodium phosphate in equal proportions, although similar results are obtained with other water soluble phosphates. In the experiments of Table I, the chromium was fed as chromic sulphate. Similar results were obtained with chromic chloride, although similar results are obtained from other trivalent chromium salts.

Under the conditions specified, the tests in Table I, without treatment (controls) show that the water was quite corrosive. It was found using the phosphate-trivalent chromium treatment, that the spinner system is a more severe test than the once-through system, since it was possible to make the phosphate-trivalent chromium treatment fail in a spinner system, where the same concentration of treatment protected in a once-through system. It is believed that this difference in behavior is due to the way the treatment is supplied. In the spinner system there is one increment of treatment per day while in the continuous system the treatment was fed continuously. Thus in a spinner system the treatment per day on 24 liters of water to give 40 p.p.m. water soluble phosphate compound and 5.1 p.p.m. trivalent chromium ion is only 1.08 grams, while in the continuous system the treatment in one day totals 40.6 grams.

It is evident that under these conditions 40 p.p.m. of water soluble phosphate and 5.1 p.p.m. of trivalent chromium ion is inadequate to prevent tuberculation and pitting, although it would greatly lower the metal loss. In this experiment, green chromic compounds were first dispersed in the water and later precipitated. At the end of the experiment there was a heavy sludge of chromic compound on the bottom of the glass jar. Since this sludge constituted the coating potential of the treatment, it is obvious why failure occurred. The coating obtained on the steel specimens was spotty and of poor texture.

Experiments 7 to 11 illustrate that the effective amino carboxylic acid compounds and their derivatives, when added as mixtures with the phosphate-chromic compound treatments, restrained and controlled the formation of the insoluble protective chromic compound. These additions caused added metal saving, eliminated the tuberculation and pitting, and thinned and improved the texture of the insoluble chromic coating on the metal specimens, and dispersed the chromium compounds so at the end of one day there was no chromium compound sediment at the bottom of the jar, and the green compound was well dispersed in the corrosive water.

It will thus be evident from Experiments 7 to 11 that the addition of an effective amino carboxylic acid to a treatment comprising water soluble phosphate and trivalent chromium ion was very efficient in controlling corrosion attack. It is also evident that the phosphate, trivalent chromium ion and effective amino carboxylic acid must all be used together if the improved results are to be obtained. Thus there was little benefit from the use of phosphate alone (Experiment 2), nor from the use of trivalent chromium ion alone (Experiment 3), nor from the use of ethylenediamine tetraacetic acid alone, nor from the use of this amino carboxylic acid with phosphate (Experiment 6) nor with trivalent chromium ion (Experiment 5).

Thus in the examples, various effective amino carboxylic acids added to water soluble phosphate and trivalent chromium ion gave marked reduction in weight loss with little or no tuberculation and pitting, and with reasonably favorable coating characteristics. These same amino carboxylic acids, while permitting turbidity to develop in the treated solution, dispersed the chromic compounds, thus preventing precipitation which would otherwise have depleted the solution of its protective chromic compounds.

The exact mechanism whereby the amino carboxylic acids function is not fully understood, but it is evident that its behavior is associated with the structures as specified earlier.

Compounds which lack these structures do not have comparable inhibiting power. Thus carboxylic acids such as acetic, adipic, citric, tartaric and formic failed to exhibit any such properties. Likewise amino compounds such as ethylenediamine, and 2 amino, 2 methyl, 1,2 propanediol among others tested did not provide substantial benefit. The amino carboxylic acids to which the invention applies and which are beneficial herein may be represented by either of the following formulae:

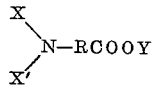

or

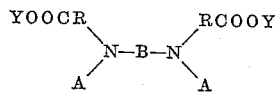

where

X is H, or an alkylol group —$CH_2OH$, —$C_2H_4OH$ or —$C_2H_3(OH)_2$ or an —RCOOY group, R being as mentioned below;

X' is an alkylol group —$CH_2OH$, —$C_2H_4OH$, or —$C_2H_3(OH)_2$ or an —RCOOY group, R being as mentioned below;

Y is H, or an alkali metal or an alkaline earth metal, nickel, cobalt or iron;

R is $CH_2$, $C_2H_4$ or $C_3H_6$;

A is H, —$CH_2COOY$, $CH_3$, $C_2H_5$, —$CH_2OH$ or —$C_2H_4OH$;

B is an alkylene group $C_2H_4$, $C_3H_6$, or an alkylol group $C_2H_3OH$, or a polyalkylene amine radical

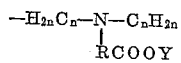

where $n$ is 1, 2, or 3. The A's need not be the same and the R's need not be the same. The carbonyl groups at the acidic end may be combined or chelated with hydrogen, or with an alkali metal such as sodium or potassium, or with an alkaline earth metal such as calcium, strontium, magnesium or barium, or with iron, nickel or cobalt. These compounds mentioned above are called herein "effective amino carboxylic acids."

The compounds having the typical formulae above indicated for the effective amino carboxylic acids must be water soluble or useful in water as dispersions or otherwise, and this concept is maintained when it is indicated that the compounds are water soluble.

Preferred and typical examples of effective amino carboxylic acids are ethylene diamine tetraacetic acid, hydroxyethylethylene diamine triacetic acid, dihydroxyethylethylene diamine diacetic acid, dihydroxyethyl glycine and diethylene triamine pentaacetic acid.

Any of these compounds can be used when neutralized wholly or in part by sodium, potassium or other alkali metals, or as chelation products with calcium, strontium or barium or other alkaline earth metals, or with nickel, cobalt or iron.

The formula below represents such a chelated compound:

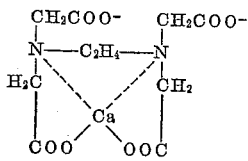

The effective amino carboxylic acid is preferably used in the concentration range of 1 to 50 p.p.m. and most desirably 2 to 20 p.p.m.

The phosphate employed should be a water soluble phosphate compound, preferably molecularly dehydrated or complex phosphate such as sodium tripolyphosphate, sodium tetraphosphate, sodium decaphosphate, sodium hexametaphosphate, and corresponding potassium, lithium, ammonium and other water soluble salts, which are characterized by a range of $Na_2O$ or the equivalent to $P_2O_5$ between 1:1 and 2:1. Orthophosphates may less desirably be used, such as disodium phosphate, monosodium phosphate, trisodium phosphate, and corresponding potassium, lithium and ammonium and other water soluble phosphates, and phosphoric acid. The concentration level of the water soluble phosphate compound will vary between 1 and 1000 p.p.m., preferably between 1 and 200 p.p.m. Since problems of solubility will occur, the concentrations will necessarily be determined in the last instance by factors such as pH, hardness, temperature, and amount of phosphate if any precipitated with the chromium.

The trivalent chromium compound may be any water soluble chromic compound and any water soluble chromous compound which through easy oxidation under the conditions of use will be converted to chromic ions. Chromic chloride, nitrate and sulphate are examples. Suitable chromous salts are the acetate and chloride. The concentration of trivalent chromium ion will vary between 0.1 p.p.m. and 100 p.p.m. and in the preferred embodiment between 0.2 p.p.m. and 25 p.p.m.

The protective treatment of the invention is operative in the pH range between 5 and 8.5 and preferably in the pH range between 5 and 6.5. Above the pH range of 8.5 the coating is soluble because of its amphoteric character. A pH below 5 is not recommended for best results and excessively low pH's cause the coating to dissolve.

While the effective amino carboxylic acids are beneficial additives to phosphate-trivalent chromic compounds in normal waters, they are of even greater benefit in waters which contain sulphides such as $H_2S$, organic sulphides, mercaptans, or other sulphides from 1 to 1000 p.p.m.

Table II shows experiments carried on in a test water containing 2 p.p.m. $H_2S$. Experiment 20 shows there was high metal loss where no treatment was used; Experiments 22, 24 and 26 at various pH's show that there was tuberculation and pitting even when 40 p.p.m. of total phosphate compound and 5.1 p.p.m. of chromium ion was present without effective amino carboxylic acid. Experiment 21 shows that a pH 6, 5 p.p.m. of ethylenediamine tetraacetic acid eliminated pitting and tuberculation and gave an acceptable coating, while at pH 7 this quantity of ethylenediamine tetraacetic acid was not effective to eliminate pitting and tuberculation in the absence of increased calcium, although as a matter of observation not shown on the table it did improve the smoothness of the coating, and it was effective on pitting and tuberculation, in the presence of increased calcium, and also further reduced the steel loss. Since calcium is usually high in cooling waters, this treatment is very beneficial.

Under actual plant operating conditions, hydrogen sulphide is rarely constant in concentration as it usually comes from a leak from the process side of the cooling system. Under these conditions its occurrence is infrequent, and near the point of leakage its localized concentration can go high in the hundreds of parts per million. This high concentration does not usually last long, as the leaks are generally stopped as soon as possible and hence the hydrogen sulphide lowers in concentration and disappears. During temporary high concentrations of hydrogen sulphide the effective amino carboxylic acids are beneficial over phosphate-chromic compound alone. In cases where leakage is not so severe, or where the sulphide is present as an organic sulphide such as mercaptan, the corrosion load is lower and is more easily taken care of by the combined treatment.

In a system containing a reducing agent such as hydrogen sulphide, the chromium may be fed as sodium chromate, sodium dichromate or corresponding water soluble chromate and dichromate salts of lithium and ammonia or other water soluble chromates and dichromates, or chromic acid anhydride. The quantities fed will be sufficient to provide trivalent chromium ion in the range between 0.1 and 100 p.p.m.

Where preferred, reducing agents may be added along with the chromate, suitable examples being sugar, alcohol, tannin, lignin (including sulphonated lignin), sulphur dioxide, sodium thiosulphate, oxalic acid, and the like. Specific examples are cane sugar, beet sugar, molasses, methyl alcohol, propyl alcohol, isopropyl alcohol, any of the alcohols mentioned in Bernthsen, Organic Chemistry (1923), pages 68 to 86 and pages 446 to 448 and any of the commercial forms of tannin and lignin. The quantity of organic reducing agent employed is not critical, and may vary between 1 and 1000 p.p.m. and preferably from 5 to 200 p.p.m. The organic reducing agent has a further advantage in serving to solubilize sludge and corrosion products.

Chlorination of the treated water has very little or no adverse effect on the treatment of the present invention, as shown in Table III. The water contains one p.p.m. of free chlorine residual. Experiments 28 and 30 show that the chlorine fed as free chlorine at 1 p.p.m. gave no harmful effect on the protection against pitting and tuberculation. These experiments are respectively one day and two day experiments. The evidence shows that the treatment containing phosphate-chromic-effective amino carboxylic acid can be used with chlorination without harmful effect.

Chlorine is not usually fed continuously but is ordinarily slugged at periodic intervals. At the time of slugging the local concentration may rise to about 1 p.p.m., gradually reducing to zero as the chlorine is consumed by the reacting constituents in the cooling water. The tests in Table III show that chlorine is compatible with the other materials of the treatment.

The formation of the coatings is independent of the character of the corrosion mechanism and of the material of the container, since they deposit on iron, steel, copper base alloys, aluminum base alloys, metallic oxides, glass, rubber and the like. Present indications are that compositions of the coatings deposited is the same in all cases.

In the pH range from 5 to 6.5 there is some indication that the phosphate predominates in the coating, but that in the pH from 6.5 to 8.5 hydrated oxides predominate in the coating, but this characteristic, while generally true, appears not to be true in every case.

In view of our invention and disclosure, variations and modifications to meet individual whim or particular need will doubtless become evident to others skilled in the art, to obtain all or part of the benefits of our invention without copying the method and product shown, and we, therefore, claim all such insofar as they fall within the reasonable spirit and scope of our claims.

TABLE I

| Experiment No. | Specimen No. | P.p.m. | | | Mgs. loss | Tubercles | Pits | Rating [2] |
| --- | --- | --- | --- | --- | --- | --- | --- | --- |
| | | P [1] | Cr | Other | | | | |
| 1 | 401–406 | | | No treatment | 76 | No [3] | No [3] | — |
| 2 | 519 | 40 | | | 35 | Yes | Yes | — |
| 3 | 521 | | 5.1 | | 48 | General | Attack | — |
| 4 | 259 | 40 | 5.1 | | 12 | Yes | Yes | — |
| 5 | 523 | | 5.1 | 15 ethylene diamine tetraacetic acid | 48 | General | Attack | — |
| 6 | 5 | 40 | | 20 ethylene diamine tetraacetic acid | 27 | Yes | Yes | — |
| 7 | 261 | 40 | 5.1 | do | 5 | No | No | + |
| 8 | 503 | 40 | 5.1 | 20 sodium dihydroxyethyl glycine | 11 | No | No | + |
| 9 | 497 | 40 | 5.1 | 20 diethylenetriamine penta acetic acid | 6 | Trace | Trace | + |
| 10 | 499 | 40 | 5.1 | 20 hydroxyethyl ethylene diaminetriacetic acid | 6 | Slight | Slight | 0 |
| 11 | 505 | 40 | 5.1 | 20 nitrilotriacetic acid | 8 | Trace | No | + |
| 12 | 507 | 40 | 5.1 | 20 ethylene diamine | 27 | Yes | Yes | — |
| 13 | 529 | 40 | 5.1 | 20-2 amino, 2 methyl 1,3 propanediol | 16 | Yes | Yes | — |
| 14 | 525 | 40 | 5.1 | 20 amino acetic acid | 14 | Yes | Yes | — |
| 15 | 127 | 40 | 5.1 | Formic acid | 29 | Yes | Yes | — |
| 16 | 129 | 40 | 5.1 | Oxalic acid | 31 | Yes | Yes | — |
| 17 | 113 | 40 | 5.1 | Citric acid | 19 | Yes | Yes | — |
| 18 | 111 | 40 | 5.1 | Acetic acid | 34 | Yes | Yes | — |
| 19 | 116 | 40 | 5.1 | Tartaric acid | 26 | Yes | Yes | — |

[1] P=equal parts of tripolyphosphate and disodium phosphate.
[2] 0 acceptable, + good, — unsatisfactory.
[3] Heavy deposit of rust. Severe etch of metal.

TABLE II

*Effect of hydrogen sulfide*

| Expt. No. | Spec. No. | P.p.m. | | | pH | Mgs. loss per day | Tubercles | Pits | Rating [2] |
| --- | --- | --- | --- | --- | --- | --- | --- | --- | --- |
| | | P.[1] | Cr | Other | | | | | |
| 20 | 300 | | | | 6 | 230 | No | No | — |
| 21 | 356 | 40 | 5.1 | 5 EDTA [3] | 6 | 3 | No | No | + |
| 22 | 358 | 40 | 5.1 | | 6 | 17 | Some | Yes | — |
| 23 | 360 | 40 | 5.1 | 5 EDTA [3] | 7 | 6 | do | Shallow | 0 |
| 24 | 362 | 40 | 5.1 | | 7 | 6 | do | do | 0 |
| 25 [4] | 364 | 40 | 5.1 | 5 EDTA [3] | 7 | 2 | No | No | + |
| 26 [4] | 366 | 40 | 5.1 | | 7 | 5 | Some | Shallow | 0 |

[1] P represents 20 p.p.m. sodium tripolyphosphate and 20 p.p.m. disodium phosphate.
[2] 0 Means acceptable, + means good, — means unsatisfactory.
[3] Ethylenediamine tetraacetic acid.
[4] Ca in Philadelphia tap water increased from 38 p.p.m. to 200 p.p.m. as $CaCO_3$.

NOTE.—Test conditions: Philadelphia tap water plus 500 p.p.m. Cl + 2 p.p.m. $H_2S$.

TABLE III
Effect of chlorination

| Expt. No. | Spec. No. | P.p.m. P[1] | P.p.m. Cr | P.p.m. Other | pH | P.p.m. free Cl₂ | Mgs. steel loss 1 day | Mgs. steel loss 2 days | Tubercles | Pits | Rating[2] |
|---|---|---|---|---|---|---|---|---|---|---|---|
| 27 | 344, 346 | 40 | 5.1 | 5 EDTA[3] | 6 | 0 | 3 | 4 | No | No | + |
| 28 | 348 | 40 | 5.1 | 5 EDTA[3] | 6 | 1 | 3 | 5 | No | No | +0 |
| 29 | 352 | 40 | 5.1 | 5 EDTA[3] | 6 | 0 | 1 | | No | No | + |
| 30 | 354 | 40 | 5.1 | 5 EDTA[3] | 6 | 1 | 2 | | No | No | +0 |

[1] P represents 20 p.p.m. sodium tripolyphosphate and 20 p.p.m. disodium phosphate.
[2] 0 means acceptable, + means good, — means unsatisfactory, +0 means in between 0 and +.
[3] Ethylenediamine tetraacetic acid.

NOTE.—Test conditions: Philadelphia tap water +500 p.p.m. Cl + 1 p.p.m. Cl₂ (free) residual.

Having thus described our invention, what we claim as new and desire to secure by Letters Patent is:

1. The process of inhibiting corrosion of the metallic parts in an industrial water system, which comprises introducing into the water from 1 to 1000 p.p.m. of water soluble phosphate, introducing into the water from 0.1 to 100 p.p.m. calculated as metal ion of a compound of trivalent chromium, introducing into the water from 1 to 100 p.p.m. of an amino carboxylic acid selected from the group consisting of

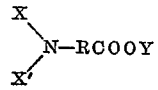

and

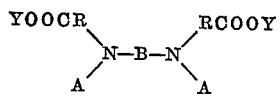

where X is a member of a class consisting of hydrogen, the alkylol groups —CH₂OH, —C₂H₄OH,

—C₂H₃(OH)₂ and an —RCOOY group;
where X' is a member of a class consisting of the alkylol groups —CH₂OH, —C₂H₄OH, —C₂H₃(OH)₂ and an —RCOOY group;
where Y is a member of a class consisting of hydrogen, the alkali metals, the alkaline earth metals, nickel, cobalt and iron;
where R is a member of a class consisting of CH₂, C₂H₄ and C₃H₆;
where A is a member of a class consisting of hydrogen, —CH₂COOY, CH₃, C₂H₅, —CH₂OH and —C₂H₄OH;
where B is a member of a class consisting of the alkylene groups C₂H₄, C₃H₆, the alkylol group =C₂H₃OH, and the polyalkylene amine radical

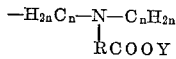

and where n is 1–3 inclusive; and maintaining in the water a pH in the range between 5 and 8.5.

2. The process of claim 1, in which the water soluble phosphate concentration is between 1 and 200 p.p.m., the water soluble compound of trivalent chromium concentration calculated as metal ion is between 0.2 and 25 p.p.m. and the amino carboxylic acid concentration is between 2 and 20 p.p.m.

3. The process of claim 1, in which the industrial water system contains sulphide, which comprises maintaining the pH in the range between 5 and 8.5 in the presence of the sulphide.

4. The process of claim 1, in which the water in the industrial water system contains free chlorine residual, which comprises maintaining the pH in the range between 5 and 8.5 in the presence of the free chlorine residual.

5. The process of claim 1, in which the amino carboxylic acid is chelated with a bivalent metal.

6. An industrial water having a maintained pH of 5 to 8.5, containing from 1 to 1000 p.p.m. of water soluble phosphate, from 0.1 to 100 p.p.m. calculated as metal ion of a compound of trivalent chromium, and from 1 to 100 p.p.m. of an amino carboxylic acid selected from the group consisting of

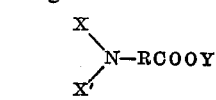

and

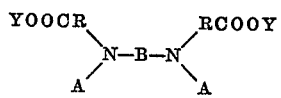

where X is a member of a class consisting of hydrogen, the alkylol groups —CH₂OH, —C₂H₄OH,

—C₂H₃(OH)₂ and an —RCOOY group;
where X' is a member of a class consisting of the alkylol groups —CH₂OH, —C₂H₄OH, —C₂H₃(OH)₂ and an —RCOOY group;
where Y is a member of a class consisting of hydrogen, the alkali metals, the alkaline earth metals, nickel, cobalt and iron; where R is a member of a class consisting of CH₂, —C₂H₄ or C₃H₆;
where A is a member of a class consisting of hydrogen, —CH₂COOY, CH₃, C₂H₅, —CH₂OH and —C₂H₄OH;
where B is a member of a class consisting of the alkylene groups C₂H₄, C₃H₆, an alkylol group =C₂H₃OH and a polyalkylene amine radical

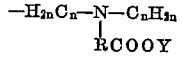

References Cited in the file of this patent
UNITED STATES PATENTS

| | | |
|---|---|---|
| 2,711,391 | Kahler | June 21, 1955 |
| 2,780,594 | Cafcas | Feb. 5, 1957 |
| 2,786,033 | Gottschall et al. | Mar. 19, 1957 |
| 2,872,281 | Kahler et al. | Feb. 3, 1959 |
| 2,885,361 | Fields | May 5, 1959 |

OTHER REFERENCES

King et al.: J. Electrochem. Soc., vol. 101, No. 2, February 1954, pp. 79–83.

King et al.: Journal of Electrochemical Soc., vol. 101, No. 12, p. 635, Discussion Section.

UNITED STATES PATENT OFFICE

CERTIFICATE OF CORRECTION

Patent No. 2,999,732                     September 12, 1961

Harry Lewis Kahler et al.

It is hereby certified that error appears in the above numbered patent requiring correction and that the said Letters Patent should read as corrected below.

In the heading to the printed specification, lines 2 to 4, title of invention, for "INHIBITING CORROSION IN WATER SYSTEMS WITH PHOSPHATE-CHROMATE-EDTA COMPOSITIONS" read -- INHIBITING CORROSION IN WATER SYSTEMS WITH PHOSPHATE-CHROMIC-EDTA COMPOSITIONS --.

Signed and sealed this 20th day of February 1962.

(SEAL)
Attest:

ERNEST W. SWIDER
Attesting Officer

DAVID L. LADD
Commissioner of Patents